Aug. 23, 1949.    H. L. SEIDEN    2,479,872
ELECTROSTATIC CONDENSER HOUSING
Filed Oct. 29, 1945
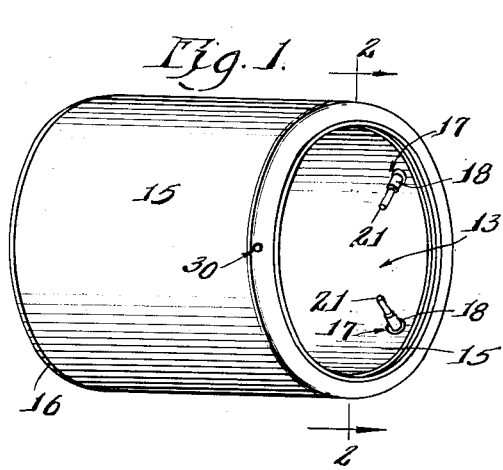
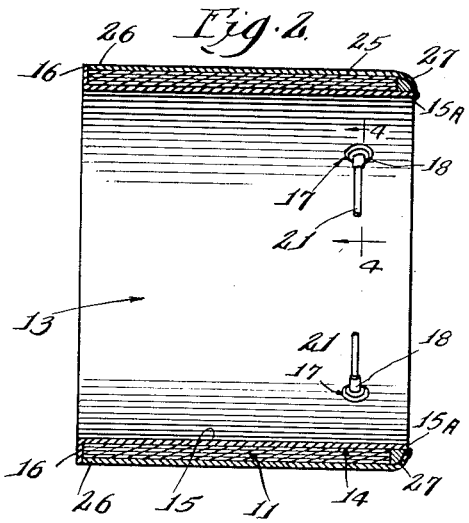
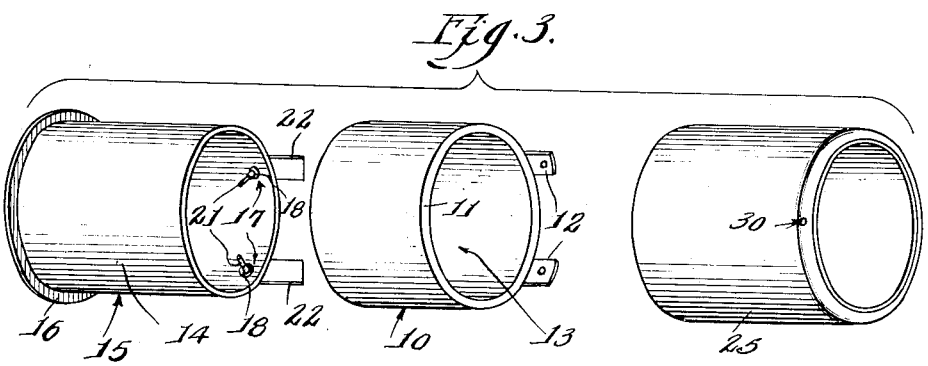
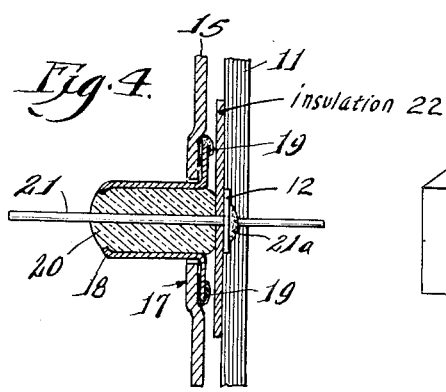
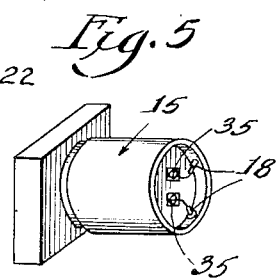
Inventor:-
Herman L. Seiden.
By Attorney.

Patented Aug. 23, 1949

2,479,872

UNITED STATES PATENT OFFICE 2,479,872

ELECTROSTATIC CONDENSER HOUSING

Herman L. Seiden, Chicago, Ill., assignor to Raymond T. Moloney, Chicago, Ill.

Application October 29, 1945, Serial No. 625,368

5 Claims. (Cl. 173—324)

This invention pertains to electrostatic condensers and has as its principal object the provision of a condenser in the shape of an annulus adapted for mounting with cooperating apparatus in compact, space-saving assembly.

A further object is the provision of an annular condenser and housing means therefor contrived to facilitate manufacture and assembly of the device and to afford a sealed, weatherproof container of rugged character.

Additional objects and aspects of novelty pertain to the details of construction of the illustrative embodiment of the device described hereinafter in view of the annexed drawing in which:

Fig. 1 is a perspective view of the condenser;

Fig. 2 is a vertical median section through the condenser, to enlarged scale, looking in the direction of lines 2—2 of Fig. 1;

Fig. 3 is an exploded assembly view in perspective;

Fig. 4 is a section through one of the sealed leads looking in the direction of lines 4—4 of Fig. 2, to enlarged scale;

Fig. 5 is a schematic representation of the manner of mounting the condenser with cooperating apparatus.

Referring to Fig. 3, the principal components of the new condenser are: a condenser unit 10 consisting of tissue-thin paper or other dielectric strips alternating in superimposed relation with extremely thin metal foil strips wound on a mandrel to form an annulus or tube, the said layers of paper and conductive foil being generally indicated at 11 in Fig. 2.

Connected with each separate set of condenser foils, two in number, as in Fig. 3, are thin metallic leads 12, of slightly heavier stock than the foil, the connection being by crimping or the like.

The hollow core portion 13 of the condenser units 10 fits closely upon the outer periphery 14 of an inner housing or casing shell 15 of zinc or the like, which has a flange or rim 16 spun out at one end to provide a stopping shoulder against which the condenser unit registers in assembled condition, and which also serves as a sealing means, as will appear.

A pair of openings are formed in flattened portions 17 of the inner shell 15 (Fig. 4), and through these openings are passed metallic eyelets 18 soldered as at 19 to said flattened portions, said eyelets having fused or heat-sealed therein an inlay of insulating glass or ceramic 20 through which pass connecting wires or leads 21. Each lead wire 21 has a small strip of fish paper or other insulating fibre 22 impaled thereon and then is passed through one of the condenser terminal leads 12 for soldering to the latter, as in the sectional view of Fig. 4, at 21A, the extending portions of the fish paper being folded over the edge of the condenser unit, and thereafter the outer shell 25 of the casing being telescoped upon the condenser in the assembled condition of Fig. 1.

The inner rim edge 26 (Fig. 2) of the outer shell fits flush against the rim or flange 16 of the inner shell, and these parts are sealed together, as by soldering or the like, while the opposite or outer rim edge 27 of the outer shell is turned over to provide a closing lip or flange, which is also sealed by soldering or the like to the underlying axial end portion 15A of the inner shell, so that the condenser unit is hermetically sealed between the telescoped shells.

As in Fig. 1, a small puncture 30 is provided in the lip portion 27 of the outer shell, by means of which the air about the condenser unit is exhausted in a low-pressure dehydrating chamber, molten wax being allowed to enter said puncture to fill up the air space and further seal the condenser against moisture, whereupon the vent or puncture 30 is sealed by soldering.

Terminals leads or lugs 21 project inwardly of the hollow center or core of the completed unit for electrical connection with terminals 35 of a cooperating instrumentality inserted in said core as in Fig. 5, this arrangement affording a convenient and short electrical connecting path, and also conserving space in confined installation quarters, as for example in the war head of a bomb, shell, or torpedo.

The invention thus provides a condenser in the form of an annulus or tube having a core of substantially greater diameter than the thickness of the condenser winding in a radial direction so that a cooperating instrumentality may be inserted in said core, it being understood of course that the thickness of the winding, radially, may be extended to be equal to, or greater than, the diameter of its hollow core portion where large electrostatic capacities are required. A condenser of the proportions shown in Fig. 3 may easily have a capacity of 1 mfd., adequate to hold an electrical charge for detonating purposes, for example.

Having thus described my invention, what I claim as new and desire to protect by Letters Patent of the United States is:

1. An electrostatic condenser housing comprising an inner tubular shell having a flange at one axial end thereof, and adapted to have a tubular condenser fitted upon said inner shell, an outer shell having an in-turned lip at an axial end thereof and adapted to be fitted over said condenser with an axial end sealed to said flange on the inner shell and said lip sealed to the opposite end of said inner shell from the flange thereof, and connecting leads for a said condenser and extended radially inward through ceramic insulating seals in eyelets in the inner one of said shells.

2. An electrostatic condenser housing comprising telescopingly spaced shells with space therebetween to receive a tubularly wound condenser, said shells hermetically sealed together when the condenser is disposed in said space, perforate bosses formed in the inner one of said shells, connecting lugs adapted to be connected from terminals of said condenser radially inward through the perforations in said bosses and sealingly insulated from the latter.

3. In an electrostatic condenser of the hollow core type, inner and outer telescoping shells providing a core, for an annular condenser to be received on the inner shell in the space between said shells and adapted to have terminal leads communicating therefrom to the innermost peripheral surface thereof, sleeves extending through said inner shell in the region of said terminal leads, a conductor from each said lead through one of said sleeves, and a dielectric seal in said sleeves, said shells hermetically sealed together, said conductors being accessible for electrical connection internally of said core.

4. A sealed casing for annular electrical devices comprising an inner cylinder having a flange at one end and adapted to have fitted thereon said annular device, an outer cylinder adapted to telescope over said device on said inner shell with an end fitted against and sealed to said flange and an opposite end spun over and sealed to the remaining end of said inner cylinder, eyelets passed through openings in the inner cylinder and soldered thereto, lead wires from said device through said eyelets, and a fused sealing inlay in each eyelet hermetically sealing off said lead wires, the latter extending into the bore of said casing for electrical connection thereat.

5. In a cored-center container for annular electrical devices, improvements comprising: inner and outer shells spaced apart to receive therebetween a said annular device, a flange at one axial end of the outer shell with which the corresponding end of the inner shell is sealed, the opposite end of said outer shell being shaped down to smaller diameter than its first mentioned axial end and sealed with the corresponding end of said inner shell, and sealed lead-out connections communicating from said space through said inner shell and into the core of the container for connection with a coacting device adapted to fit therein.

HERMAN L. SEIDEN.

REFERENCES CITED

The following references are of record in the file of this patent:

UNITED STATES PATENTS

| Number | Name | Date |
| --- | --- | --- |
| 2,029,550 | Albert | Feb. 4, 1936 |
| 2,107,132 | Smith | Feb. 1, 1938 |
| 2,166,830 | Thorson | July 18, 1939 |